United States Patent [19]

Hong

[11] Patent Number: 5,227,732
[45] Date of Patent: Jul. 13, 1993

[54] NOISE REDUCTION CIRCUIT

[75] Inventor: Kwon-pyo Hong, Suwon, Rep. of Korea

[73] Assignee: Samsung Electronics Co., Ltd., Rep. of Korea

[21] Appl. No.: 868,862

[22] Filed: Apr. 16, 1992

[30] Foreign Application Priority Data

Apr. 30, 1991 [KR] Rep. of Korea ............ 91-6003
Mar. 7, 1992 [KR] Rep. of Korea ............ 92-3643

[51] Int. Cl.⁵ .................. H03K 5/00; H03K 5/153
[52] U.S. Cl. ............................. 328/167; 307/542;
307/543; 307/556; 307/520; 307/358; 307/529
[58] Field of Search ................ 328/60, 61, 158, 162,
328/165, 167, 127; 307/540, 542, 543, 555, 556,
520, 358, 529

[56] References Cited

U.S. PATENT DOCUMENTS

| | | | |
|---|---|---|---|
| 4,144,500 | 3/1979 | Tokunaga | 325/480 |
| 4,311,963 | 1/1982 | Watanabe et al. | 328/163 |
| 4,460,871 | 7/1984 | Orban | 328/169 |
| 4,736,163 | 4/1988 | Berkhout et al. | 328/162 |
| 5,087,834 | 2/1992 | Tsay | 307/543 |
| 5,130,579 | 7/1992 | Thomas | 307/543 |

FOREIGN PATENT DOCUMENTS 1561188 4/1990 U.S.S.R. ............................. 328/162

Primary Examiner—William L. Sikes
Assistant Examiner—Terry D. Cunningham
Attorney, Agent, or Firm—Sughrue, Mion, Zinn, Macpeak & Seas

[57] ABSTRACT

A circuit for reducing noise from a luminance signal which controls the brightness of the screen in a video apparatus such as a color TV, VCR or VDP is disclosed. The circuit comprises a gate circuit for time-chopping a noisy luminance signal by a predetermined interval, a level detector for integrating the chopped luminance signal to detect an average DC level, a clipping circuit for clipping the chopped luminance signal based on the average DC level, a subtracter for subtracting the clipped signal from the chopped luminance signal, a level shift circuit for shifting the level of the subtracted luminance signal according to the average DC level and compensating the clipped luminance level, and a low-pass filter for low-pass-filtering the level-shifted signal, to thereby restore it to an original-waveform luminance signal. Accordingly, the circuit can prevent the edge of the luminance signal from being collapsed due to noise, resulting in the output of a noiseless luminance signal.

2 Claims, 3 Drawing Sheets

FIG. 1 (PRIOR ART)
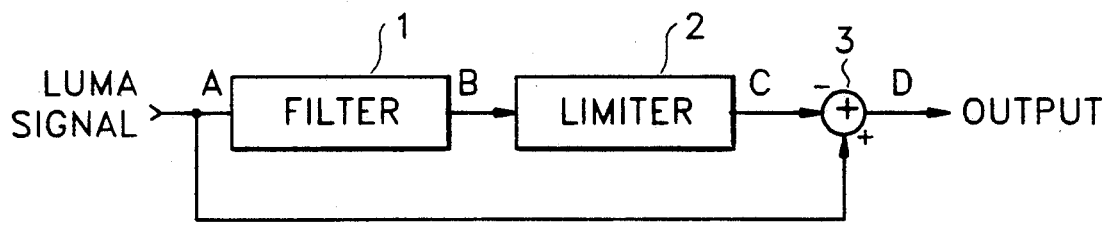
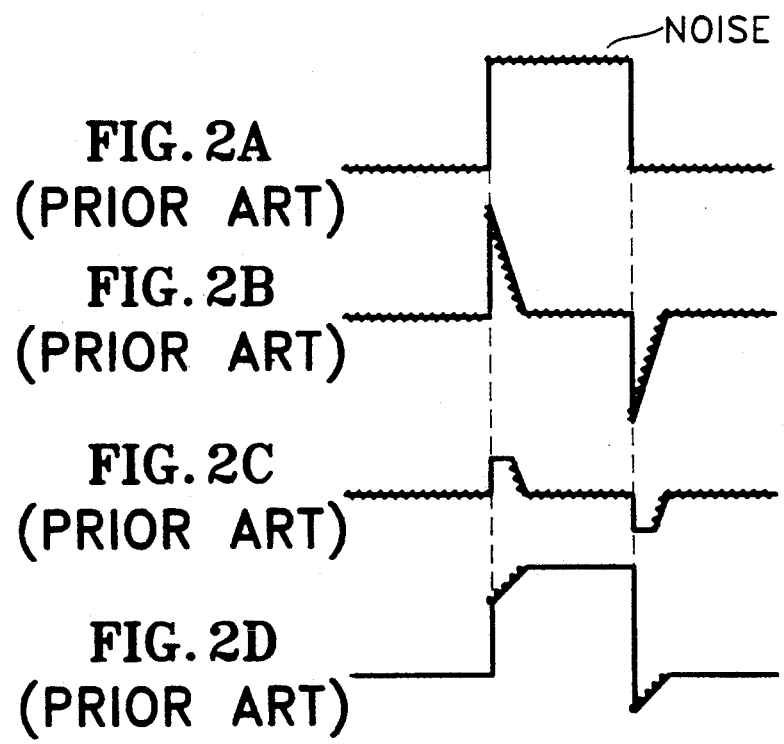
FIG. 2A (PRIOR ART)
FIG. 2B (PRIOR ART)
FIG. 2C (PRIOR ART)
FIG. 2D (PRIOR ART)

NOISE REDUCTION CIRCUIT

BACKGROUND OF THE INVENTION

The present invention relates to a noise reduction circuit in a video apparatus, and more particularly to a circuit for reducing a noise included in a luminance signal input to a luminance signal processing system of a video cassette recorder, a video disc player, or a color television.

A video apparatus such as a color television, a video cassette recorder, or a video disc player needs a luminance signal to control screen brightness. The ratio of the primary colors, i.e., the red, green, and blue luminance signals, is approximately 0.3:0.59:0.11. Mixing the three signals with this ratio is the optimal setting for the color sensitivity of the human eye. However, since such a luminance signal includes noise, a circuit for noise reduction has been developed, which will be briefly described.

FIG. 1 is a conventional circuit for reducing the noise of a luminance signal, in which a noisy input luminance signal as shown in FIG. 2A is filtered in a high-pass filter 1 and results in the waveform shown in FIG. 2B. This signal is then supplied to a limiter 2 which limits its amplitude and results in the waveform shown in FIG. 2C. Thereafter, the amplitude-limited signal is supplied to a subtracter 3 which subtracts the signal shown in FIG. 2C which has passed through limiter 2, from the input luminance signal (FIG. 2A), resulting in the output waveform shown in FIG. 2D, thereby reducing the noise.

However, this noise reduction circuit leaves a noise as shown in FIG. 2D, resulting from a remaining noise and distortion both due to the delay of the signal of filter 1 in the contour portion of the final output signal from subtracter 3. Accordingly, the edge of the luminance signal is collapsed.

Also, a circuit for reducing a noise by clamping a video signal using a horizontal pulse, detecting a noise from the clamped video signal, and controlling the clamping level according to an average level variation of the luminance signal has been known for many years.

SUMMARY OF THE INVENTION

It is an object of the present invention to provide a noise reduction circuit which time-divides an input luminance signal and detects an average DC level of such a luminance signal, clips the time-divided luminance signal based on the average DC level, subtracts the clipped signal from the time divided luminance signal, shifts the subtracted signal according to the average DC level, and then low-pass-filters the shifted signal, thereby outputting a noiseless luminance signal.

To achieve the above object of the present invention, there is provided a noise reduction circuit comprising:

time division means for time-dividing a noisy luminance signal according to a clock signal having a predetermined frequency;

average luminance level detecting means for integrating the time-divided luminance signal output from the time division means and calculating an average DC level;

clipping means for clipping the output of the time division means based on the average DC level from the average luminance level detecting means;

subtracting means for subtracting the clipped signal output from the clipping means from the time-divided luminance signal output from the time division means;

level shift means for compensating the level of the subtracted luminance signal according to the average DC level; and low-pass filtering means for low-pass-filtering the level shifted signal output from the level shift means and restoring the low-pass-filtered signal to an original-waveform luminance signal.

BRIEF DESCRIPTION OF THE DRAWINGS

The above object and other advantages of the present invention will become more apparent by describing the preferred embodiment of the present invention with reference to the attached drawings, in which:

FIG. 1 is a block diagram showing the constitution of the conventional noise reduction circuit;

FIGS. 2A through 2D are operational timing diagrams of the noise reduction circuit shown in FIG. 1;

DETAILED DESCRIPTION OF THE INVENTION

Figure 3:
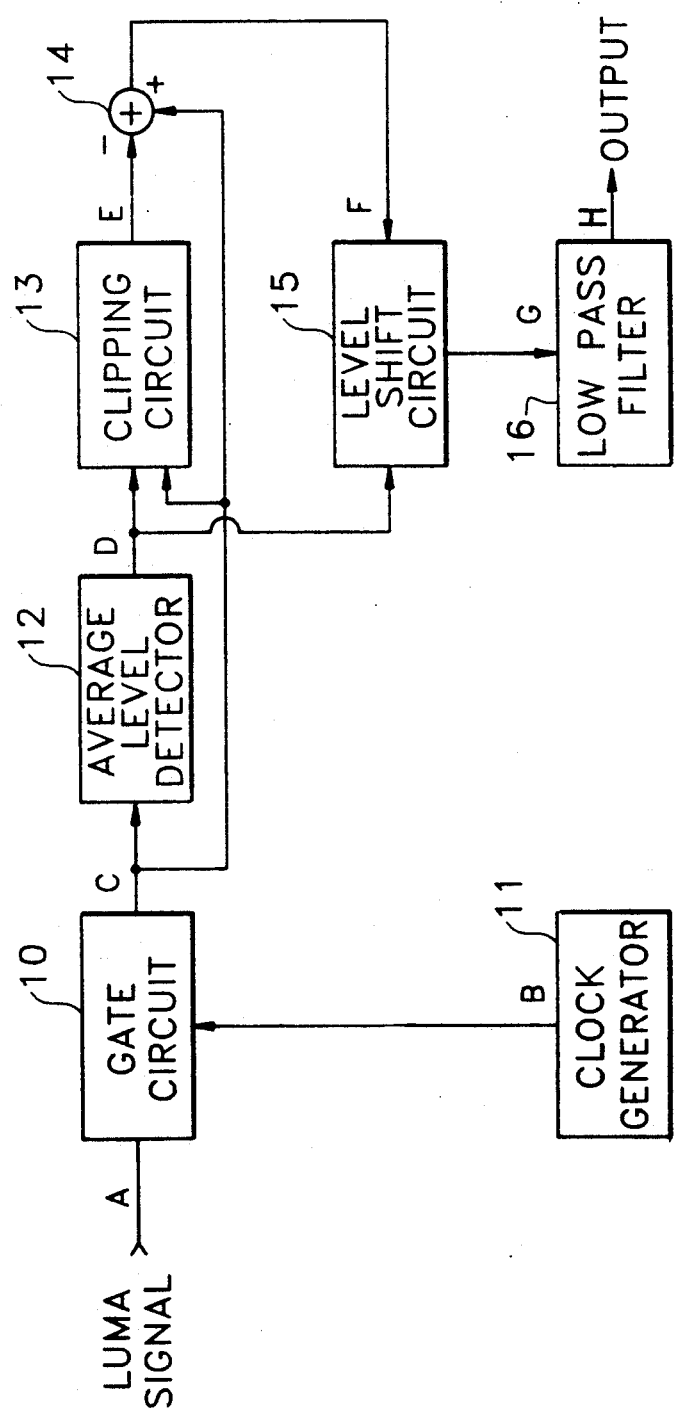
FIG. 3 is a block diagram showing the constitution of an embodiment of the noise reduction circuit according to the present invention.

Referring to FIG. 3, the input of a gate circuit 10 is connected to a luminance signal source (not shown), its clock input terminal is connected to the output of a clock generator 11, and its output is connected to the input of an average luminance level detector 12, the second input of clipping circuit 13, and the minuend terminal of a subtracter 14. The first input of a clipping circuit 13 is connected to output of average luminance level detector 12, while its output is connected to the subtrahend terminal of subtracter 14. First and second inputs of a level shift circuit 15 are connected to the outputs of average luminance level detector 12 and subtracter 14, respectively, while its output is connected to the input of low-pass filter 16.

Hereinafter, the operation of the circuit shown in FIG. 3 will be described with reference to the operation timing diagrams shown in FIGS. 4A–4H.

Figure 4A:
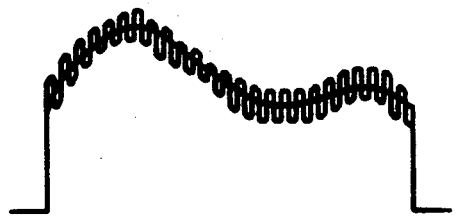
FIGS. 4A through 4H are operational timing diagrams of the noise reduction circuit shown in FIG. 3.
Figure 4B:
Figure 4C:
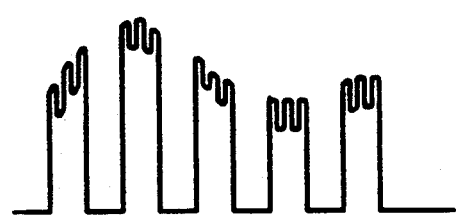
Figure 4D:
Figure 4E:
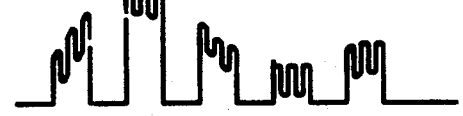
Figure 4F:

Referring to FIG. 3, a noisy luminance signal (as shown in FIG. 4A) from the luminance signal source is input to gate circuit 10 which consists of an electronic switch. The gate circuit 10 passes the luminance signal input only during "high" intervals of the clock signal (FIG. 4B) from clock generator 11 and cuts off the luminance signal input during "low" intervals of the clock signal. Accordingly, gate circuit 10 chops the luminance signal including the noise by a predetermined interval according to the clock signal (shown in FIG. 4B) generated from clock generator 11 and generates the noise-includes and time-chopped luminance signal as shown in FIG. 4C. At this time, the frequency of the clock signal supplied from clock generator 11 is at least twice the upper limit of the reproducing band of the luminance signal according to the Nyquist theorem, so as to maintain the original waveform of the luminance signal. The chopped luminance signal is input to average luminance level detector 12, clipping circuit 13 and subtracter 14. Average luminance level detector 12 integrates the chopped luminance signal to detect an average DC level and simultaneously supplies the average DC luminance level shown in FIG. 4D to clipping circuit 13 and level shift circuit 15.

In the meantime, clipping circuit 13 adaptively clips the chopped luminance signal in response to the average DC level of the luminance signal. That is, clipping circuit 13 clips the chopped luminance signal (FIG. 4C) by such means as a diode, in the clipping circuit and supplies the clipped signal shown in FIG. 4E to subtracter 14. Here, the output of clipping circuit 13 has the waveform shown in FIG. 4E, which is the luminance signal component including the noise component. Thereafter, subtracter 14 subtracts the clipped luminance signal (FIG. 4E) output from clipping circuit 13 from the chopped luminance signal (FIG. 4C) output from gate circuit 10, and outputs a noiseless luminance signal such as the waveform of FIG. 4F to level shift circuit 15.

Figure 4G:
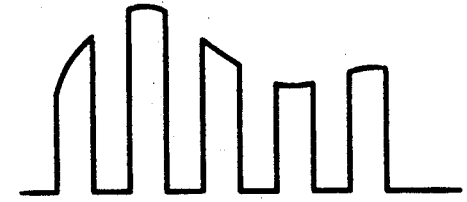

The level shift circuit 15 adds the average DC level of the subtracted luminance signal (FIG. 4F) from subtracter 14 to average DC level (FIG. 4D) of average luminance level detector 12 using a level shifter or adder, and compensates for the clipped luminance level from clipping circuit 13, resulting in the waveform shown in FIG. 4G. This level-shifted signal is supplied to low-pass filter 16.

Also, level shift circuit 15 is able to adjust the output level of subtracter 14, through the user's manual manipulation using a variable resistor.

Low-pass filter 16 passes that frequency component which is lower than the upper limit of the reproducing band of the level-shifted luminance signal output from level shift circuit 15, while cutting off the higher frequency component.

Figure 4H:
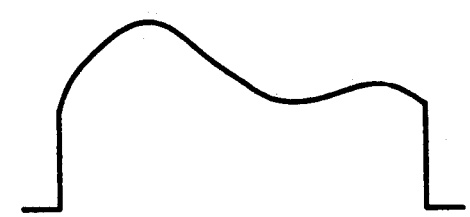

Accordingly, the output of low-pass filter 16 has the original waveform shown in FIG. 4H, so that a noiseless luminance signal only is supplied as the output to a color signal processor (not shown).

As described above, the noise reduction circuit according to the present invention can prevent the edge of the luminance signal from being collapsed, which occurs when the conventional filter and limiter are used therein, to thereby output a noiseless luminance signal.

What is claimed is:

1. A noise reduction circuit comprising:
   chopper means for chopping a noisy luminance signal according to a clock signal having a predetermined frequency;
   average luminance level detecting means for integrating the chopped luminance signal output from said chopper means and calculating an average DC level;
   clipping means for clipping the output of said chopper means according to the average DC level of said average luminance level detecting means;
   subtracting means for subtracting the clipped signal output from said clipping means from the chopped luminance signal output from said chopper means;
   level shift means for compensating the level of the subtracted luminance signal according to said average DC level; and
   low-pass filtering means for low-pass filtering the level-shifted signal from said level shift means and restoring the low-pass filtered signal to an original-waveform luminance signal.

2. The noise reduction circuit as claimed in claim 1, wherein said chopper means comprises an electronic switch for gating said noisy luminance signal input according to said clock signal.

* * * * *